March 10, 1931.    J. W. MEADOWCROFT    1,796,114

DOOR AND METHOD OF CONSTRUCTING SAME

Filed Oct. 18, 1927

INVENTOR.
JOSEPH W. MEADOWCROFT.
BY John P. Tarbox
ATTORNEY.

Patented Mar. 10, 1931

1,796,114

UNITED STATES PATENT OFFICE

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

DOOR AND METHOD OF CONSTRUCTING SAME

Application filed October 18, 1927. Serial No. 226,859.

This invention relates to a metal door construction and to the method of forming the same. It is particularly applicable to a door construction for open or closed automobile bodies.

Automobile doors are usually constructed by attaching inner and outer panels to separate members forming the hinge and jamb rails of the door. The configuration of the jamb and hinge rails and the outer door overlap are furnished for the most part by these separate members. As a rule, these rail members have oppositely directed flanges upon their inner and outer edges to which are connected the inner and outer panels respectively. On account of the outer door overlap, it has been customary to flange the outer panel around the overlapped flange of the rail. This construction, however, has practically precluded the welding of the outer panel to the rail flange by any ordinary form of spot welding as such welding would result in producing weld marks upon the outer panel. The usual form of door construction is also relatively expensive to manufacture because of the number of its structural elements and the number of assembly operations required in joining the same together. Likewise, as the rails are depended on for the main strength of the door, they are formed of much heavier gauge metal than the panels.

The main object of the present invention is to provide a metal door construction which is capable of expeditious and economical manufacture and assembly because of the relatively few and simple parts used therein but which, at the same time, possesses strength and stability.

Among the many other objects are the provision of a door construction composed of readily formed stamped metal panels, the provision of a heavy strong outer overlap the flange of which may be spot welded by the usual spot welding machine, and the elimination of the use of heavy gauge door rails.

Of course, there are other objects and advantages not specifically set forth above which will become apparent as the description progresses. The attainment of the objects sought is accomplished by forming the door of inner and outer panels which are so coactingly flanged around their peripheral edges that such flanges may be spot welded together at points which may be subsequently crimped over in the formation of the door overlaps.

Figure 1:
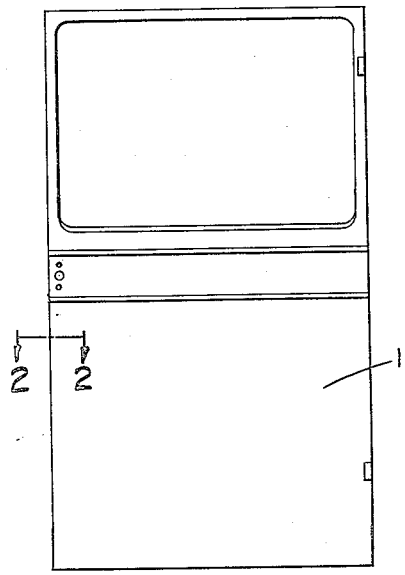
Figure 2:
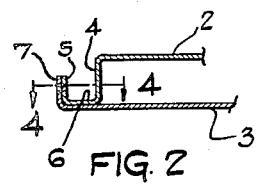
Figure 7:
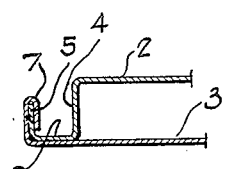
Figure 6:
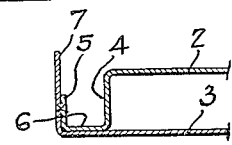
Figure 3:
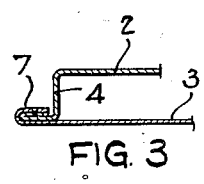
Figure 8:
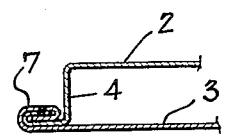
Figure 4:
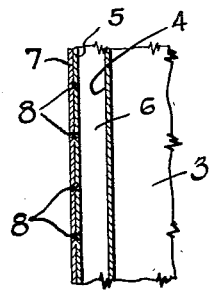
Figure 5:
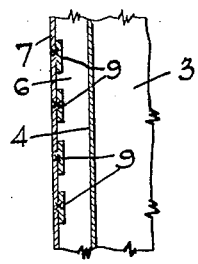

Embodiments of the invention are illustrated in the accompanying drawing wherein, Figure 1 shows in side elevation an automobile door constructed according to the invention, Figure 2 is a horizontal sectional view through the door of Figure 1 taken on line 2—2 thereof, Figure 3 is a sectional view similar to Figure 2, the flanges having been crimped together, Figure 4 is a sectional view taken on line 4—4 of Figure 2, Figure 5 is a sectional view corresponding to the section shown in Figure 4 but disclosing another form of the invention, and Figures 6, 7 and 8 are sectional views similar to Figures 2 and 3 but disclosing a still different form of invention.

The door 1 is formed of inner and outer sheet metal panels 2 and 3. These panels are of simple configuration and may be readily stamped by simple die stamping operations. An inner panel is provided around its peripheral edges with a substantially U-shaped flange extending inwardly of the door. This flange, while extending inwardly of the door, faces rearwardly thereof, or, in other words, forms a channel presenting inwardly of the automobile body. This U-shaped flange or channel is formed of side walls 4 and 5 and a base portion 6. The wall 4, which is that wall directly connected to the main portion of the panel is, in the form being described, of greater depth than the wall 5. The outer panel 3 is provided with a flange 7 projecting inwardly of the door. From this construction it may be seen that the door panels can be assembled by nesting the inner panel within the outer panel, the angle formed by the wall 5 and base 6 of the inner panel flange nesting within the angle formed by the flange 7 with the outer panel. Because of this nesting relationship, it is seen that the assembly of the two door elements may be quickly and easily accomplished as it amounts simply to a telescoping operation.

The panels having been assembled in this nesting relationship, the flanges of the wall 5 of the inner panel flange are permanently secured to the flange 7 of the outer panel by spot welding the two together as desired at intervals 8 throughout their length. This spot welding may be performed by any conventional form of welding machine, it being immaterial where the weld marks appear as a result thereof. Also, the two panels being spot welded together along these points are held against relative displacement which insures stability of the door construction.

The panels having been welded together as described, the wall 5 and the flange 7 are then crimped downwardly by a suitable crimping apparatus to the position shown in Figure 3. They are therefore doubly secured together and held in fixed relationship with one another. The crimping operation, of course, taking place around the entire periphery of the door, there is no possibility of the panels undergoing any relative displacement when in use. Also, when the panels have been crimped in this manner, it will be seen that the door will have a strong overlapped flange formed of four plies of metal. Likewise, the entire door structure will possess equivalent strength to the older form of construction wherein door rails were used because where the panels have been welded and crimped together there is formed throughout the extent of the door a box girder like construction.

In the form shown in Figure 5, the wall 5 of the inner panel flange is changed to a slight extent. Instead of the wall 5 being coextensive with the base 6, it is simply contemplated to provide tabs 9 upon the outer edge of the base 6 and to turn such tabs inwardly of the door so as to lie against the flange 7 of the outer panel. The flange 7 is then spot welded to the tabs 9 after which they are crimped downwardly in the same manner as the wall 5 and the flange 7.

In a slightly different form illustrated in Figures 6, 7 and 8, the flange 7 is formed so as to be of substantially twice the depth of the wall 5. The spot welding of the flange 7 and the wall 5 takes place in the same way as before described after which that portion of the flange 7 projecting above the wall 5 is crimped around such wall, as shown in Figure 7. After attaining this position the crimped flange 7, together with the wall 5 embraced thereby, are crimped downwardly as is done in the other forms.

This results in an even heavier overlapped flange in that it provides the five ply flange as shown in Figure 8.

Upon the foregoing description it should be apparent that the door is constructed of two main elements, such elements being of a configuration readily produced from sheet metal by a die stamping operation. Also, because of the configuration of the elements, they may be most easily assembled by merely nesting or telescoping the same together. Since the coacting flange portions that are welded together are subsequently crimped inwardly, it is possible to perform such welding by spot welding as it is immaterial whether weld marks occur or not. There is a double guarantee that the panels will be held against relative displacement since they are not only welded, but crimped together around their entire periphery. The two connected panels forming in effect a box girder like formation provide a door construction possessing all the strength of former door constructions, but having fewer parts included therein.

The invention may take various modifications and adaptations within the scope of the appended claims.

What I claim is:—

1. A door comprising inner and outer sheet metal panels having cooperating angular portions including inwardly extending arms around their peripheries, said panels being telescoped within each other with said inwardly extending arms in engagement and permanently secured together by welding, the outer panel arm being crimped over the inner panel arm and the three-ply flange so formed turned down.

2. A door comprising inner and outer sheet metal panels having cooperating portions spaced peripherally of the main body of the inner panel adapted to telescope within each other and to be permanently secured together by welding, said cooperating portions being crimped inwardly of the door and forming a part of the door overlap flange.

3. A door comprising inner and outer sheet metal panels, the inner panel having an angular periphery one arm of which extends inwardly of the door, the outer panel having an inwardly extending peripheral flange and of such size that the inner panel and its angular periphery may be telescoped within the said peripheral flange, the inwardly extending arm of the inner panel lying in engagement with the outer panel flange and adapted to be welded thereto, said peripheral flange and said arm being crimped upon the other arm of the angular periphery of the inner panel to form a part of the door overlap flange.

4. A door comprising inner and outer sheet metal panels, the inner panel having an inwardly presenting channel around its periphery, the outer panel having a plane portion coextensive with the inner panel and its channel and a flange portion projecting inwardly of the door around its periphery, said inner panel being adapted to be telescoped within said outer panel, so that the outer wall of the inner panel channel lies against the outer panel flange and is secured thereto, said outer wall and said flange being crimped inwardly upon the channel base and forming with the outer panel and the said base a multi-ply overlap flange.

5. A method of forming a door consisting of stamping inner and outer sheet metal door panels so as to have cooperating flanges, assembling the same by welding together said flanges, and then crimping the flanges inwardly so as to lie behind the outer panel and form therewith a part of the door overlap.

6. A method of forming a door consisting of flanging the inner and outer panels so as to form cooperating portions around the door periphery, telescoping the inner and outer panels, welding such flanges together and crimping the same inwardly so as to lie behind the overlap flange formed by the panels.

7. A door comprising inner and outer panels the marginal portions of which are arranged in overlying relation and are jointly reversely bent to provide a door overlap of at least four-ply thickness.

8. A door comprising inner and outer panels the marginal portions of which are arranged in overlying relation and are jointly folded over to provide a door overlap of at least four-ply thickness, the folded-over portions of said panels being permanently secured together by welding.

In testimony whereof he hereunto affixes his signature.

JOSEPH W. MEADOWCROFT.